July 21, 1964 G. T. CULBERTSON 3,142,004
TRANSISTOR TIMING DEVICE
Filed Aug. 24, 1960 2 Sheets-Sheet 1

INVENTOR.
GEORGE T. CULBERTSON
BY
Owen & Owen

INVENTOR.
GEORGE T. CULBERTSON
BY
Owen & Owen

United States Patent Office 3,142,004

Patented July 21, 1964

3,142,004

TRANSISTOR TIMING DEVICE

George T. Culbertson, Gardena, Calif., assignor to Theodore W. Hallerberg, Los Angeles, Calif.

Filed Aug. 24, 1960, Ser. No. 51,642
8 Claims. (Cl. 317—142)

This invention relates in general to timing devices and more specifically to time delay circuits utilizing transistors to control the operation of a load device.

In the prior art, load devices which may comprise direct current relays have been operated under the timing control of mechanical, electro-mechanical, vacuum tube or thermal timers. Mechanical timers are bulky and tend to add considerable weight to any installation of which they are a part; electro-mechanical timers utilize large amounts of power inefficiently and are bulky; vacuum tube timers are fragile, suffer from the effects of vibration and require high voltages; and thermal timers may not be recycled without allowing a time interval between operations. These are a few of the major disadvantages of existing devices which may be overcome by my invention utilizing semi-conductors as control elements in an improved time delay device. Thus, the primary object of the present invention is to provide a small, rugged and efficient time-delay device which is capable of rapid recycling and which operates with a precisely determinable delay.

A further object of my invention is to provide a very accurate time delay device which may be utilized after long periods of dis-use to provide a constant, repeatable timed cycle.

Another object of this invention is to provide a time delay device which may operate over wide ranges of adjustability and may give accurately timed periods in spite of poorly regulated line voltages.

A further object of this invention is to provide a transistorized time delay device where an output load device is controlled after a predetermined time period and is maintained in its controlled condition until reset.

In my prior application, Serial No. 7410, filed February 8, 1960, assigned to the same assignee as this present invention, I have described and claimed a double-base diode, sometimes termed a unijunction transistor, with an output load in the emitter to base one path energized after a predetermined time by the firing of the semi-conductor device. In that application, the energy sufficient to cause a relay to pull in and latch must come from the charge on a timing capacitor. In this present or improved application, the firing of a double-base diode causes a further transistor to conduct to a load which then locks that transistor in its conducting state independently of a sustained triggering signal from the double-base diode.

A further object of this invention is to provide a novel transistor triggering arrangement controlled from a double-base diode.

The novel features of this invention are set forth with particularity in the appended claims. The invention itself, however, with its preferred organization and mode of operation as well as further objects and advantages may best be understood from the following description taken together with the accompanying drawings, in which:

Since each form of this invention utilizes a double-base diode as a timing trigger for controlling an output transistor, a brief description of that device is presented. A double-base diode generally is formed of an "N" type semi-conductor bar having two ohmic base contacts with a "P" type emitter mounted therebetween. With a constant potential applied to the base contacts, the emitter voltage may be used to control conduction of the device. In the non-conducting condition, the potentials are such that the emitter is back biased. When the emitter potential is increased sufficiently, "holes" are injected into the bar and towards one of the bases by the field potential applied across the bar. The emitter current then increases rapidly until limited by the emitter source of potential.

Figure 1:
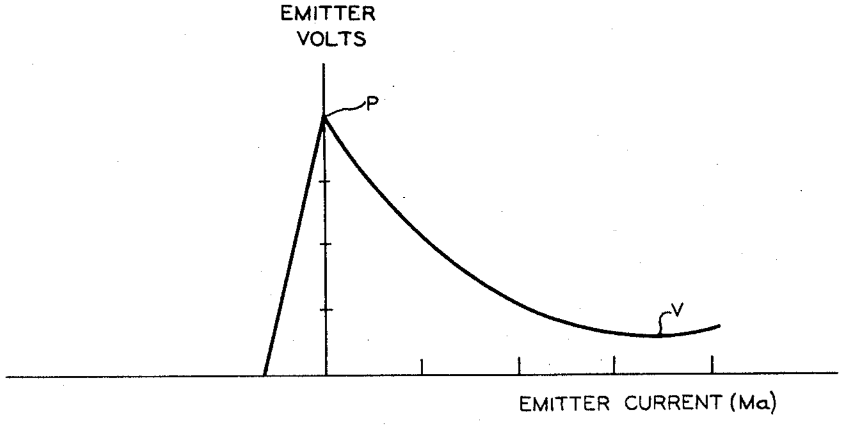
FIG. 1 is an illustration of the emitter current-voltage characteristic of a double-base diode.

FIG. 1 aids in the understanding of operation of a double-base diode. To the left of peak point P, there is a slight reverse or negative current through the emitter to base one PN junction of the bar. As the emitter potential is increased to the peak point P, the PN junction becomes biased in the forward conducting region. The device then enters the negative resistance region between points P and valley point V. The excess of "holes" injected into the base bar increases the conductivity between the emitter and base one connections and as a consequence, the voltage between the emitter and base one decreases to point V. Beyond or to the right of point V, base one has reached saturation and a further increase in emitter current merely provides an additional voltage drop between the emitter and base two portion of the bar.

Figure 2:
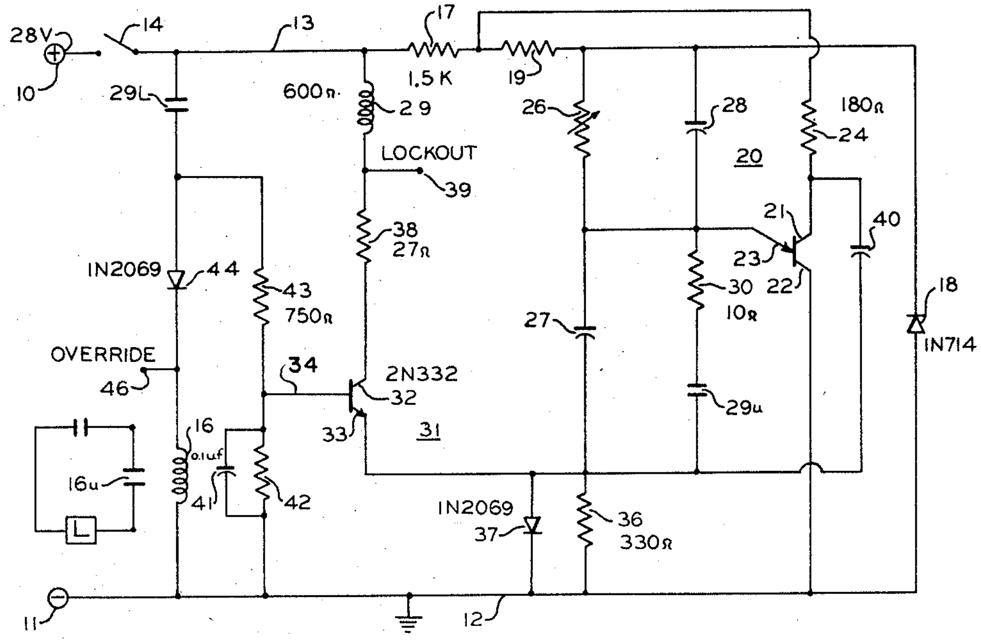
FIG. 2 is a schematic circuit diagram of one form of the invention.

FIG. 2 illustrates a delayed pull-in output relay circuit operated from terminals 10 and 11 for receiving positive and negative direct current line voltages. Terminal 11 connects to line 12 which is illustrated as being grounded and may serve as a reference potential. Terminal 10 connects to line 13 through switch 14 which is illustrated as being a mechanical switch although it may be relay contacts or a high speed vacuum tube or transistor switch operated under control of an operator or an automatic circuit control. Switch 14 closes to begin the time delay before an output relay 16 has its operating condition altered. Resistor 17 is a voltage dropping resistor used in connection with zener diode 18 and resistor 19 as a voltage regulator compensating for voltage changes or "spikes" appearing on lines 12 and 13. This assures that the voltage across the timing circuit will be maintained constant.

Double-base diode 20 has a base one terminal 22, a base two terminal 21, and an emitter terminal 23. Base one connects directly to ground whereas base two connection 21 goes through resistor 24 to the junction between dropping resistor 17 and small valued stabilizing resistor 19. Resistor 19 is selected to provide minimum variations in timing. Resistor 24 is a temperature compensating resistor for use with the diode 20 which has a positive temperature coefficient. An understanding of the temperature regulation may be had from the following equation:

$$V_P = kV_{BB} + V_D \qquad (1)$$

where $V_P$ is the peak voltage of FIG. 1, $k$ is essentially a constant termed the Intrinsic Stand-off Ratio, $V_{BB}$ is the interbase voltage, and $V_D$ is diode potential. In order to maintain $V_P$ constant, it is necessary to allow $V_{BB}$ to increase with increasing temperatures. This is so since the term $V_D$ decreases slightly with increasing temperature. Accordingly, the voltage changes are absorbed in resistor 24 to accomplish the desired result allowing for repeatable time delay action.

The emitter 23 connects midway between adjustable resistor 26 and capacitor 27 of the timing circuit. Although resistor 26 is shown as adjustable, it is understood that the capacitor 27 may be adjustable to vary the charging time as is well known. Additionally, capacitor 28 shunts resistor 26. Capacitor 28 has a very small value compared to capacitor 27 and is added for stability. With the inclusion of this element, it is found that the first and subsequent time delays after long periods of dis-use are stable and repeatable. It is theorized that the effective capacity of capacitor 27 changes after long periods of dis-use to cause the first operation after such dis-use to fire the double-base diode late. Capacitor 28 appears to compensate for this variation by assuming an uncharged state initially but a subsequently charged condition after its first operation and before the charge can leak off through resistor 26. Timing capacitor 27 is shunted by contacts **29*u* in series with small valued resistor 30 which prevents pitting of the contacts. The contacts 29*u* close to discharge capacitor 27 after device 20** fires and the charge on the capacitor has served its purpose. Thus, the capacitor is discharged to allow for further timed periods without waiting between cycles of operation of the time delay device.

An output transistor 31 has an emitter electrode 33, base electrode 34, and collector electrode 32. Emitter 33 is connected to the bottom of capacitor 27 and to ground through paralleled resistor 36 and forward poled diode 37. The resisor 36 and diode 37 serve to provide a bias condition for NPN transistor 31 to keep it at cut-off until device 20 fires. When transistor 31 is conducting independently of double-base diode 20, resistor 36 is effectively by-passed by diode 37 so that it does not absorb useful power from relay 29. Relay 29 is connected in series with a small resistor 38 from line 13 to collector 32. At their junction is a terminal 39 selectively provided with a positive voltage source of lockout signals to preclude the energization of relay 29. Resistor 42 connects the base 34 to ground and is shunted by capacitor 41. Capacitor 40 also connects from base two 21 to the top of diode 37 to by-pass transients.

Relay 29, in addition to having contacts **29*u* across capacitor 27, also has contacts 29L connected from line 13 to base 34 through resistor 43. The lower end of contacts 29L are also connected through a forwardly poled diode 44 to an override terminal 46 which may selectively be provided with a source of positive voltage potential to energize an output circuit instantly, irrespective of the condition of the charge being applied to timing capacitor 27. The diode 44 connects to ground through the relay winding 16 which controls the energization of an output circuit through contacts 16*u*** in a well known manner.

In operation, the switch 14 is closed to begin a timing cycle applying potential across the timing circuit including capactor 27. Unijunction transistor 20 is non-conducting and is in a condition represented by a point to the left of peak point P illustrated in FIG. 1. Transistor 31 is also non-conducting since the base 34 is connected to ground and the emitter 33 is connected to ground through diode 37 and resistor 36. The resistor 36 serves to counteract the non-linear characteristics of the diode and is used to make sure that there will be an exponential charging current in the timing circuit. Without the resistor, the timing characteristics of the unit are erratic and the inclusion of this resistor makes the device much more repeatable. Zener diode 18 is connected across the timing circuit and maintains a constant voltage thereacross by adjusting its current in accordance with the potential applied to input terminals 10 and 11. The major variations of line voltage are dropped across resistor 17. When the charge on capacitor 27 reaches the level of P, illustrated in FIG. 1, unijunction transistor 20 fires and the major portion of the voltage developed across capacitor 27 now appears across resistor 36 with a negative polarity at the emitter electrode 33 of transistor 31. The diode 37 represents a high impedance to this discharge.

Transistor 31 now receives a forward bias and current flows through limiting resistor 42 into the base 34 providing a low impedance path through relay winding 29, resistor 38 and the collector-emitter path of transistor 31. When the device 20 fires, the voltage at the emitter 33 is found to be several volts below ground potential accounting for the conduction of transistor 31. The energization of relay 29 closes contacts 29L to apply a positive line potential through resistor 43 to the base 34 locking in the transistor 31 into a continuously conducting condition. Contacts **29*u* also close discharging the capacitor 27 and allowing the emitter 33 to return nearly to ground potential by virtue of the forward drop across diode 37. At the instant when contacts 29L close, a path is also completed through forward diode 44 to energize output relay 16 and the corresponding output circuit controlled by contacts 16*u*. Thus, the output relay is allowed to be pulled in after a predetermined time delay resulting from the firing of double-base diode 20. An override positive potential may be applied to terminal 46 at any time to by-pass the normal timing circuit to energize output relay 16. Capacitor 28 meanwhile acquires a charge and when switch 14 is opened, then closed again to begin a second timed operation, the charge on capacitor 28** acts in a manner hereinbefore described to cause repeatable timing operation.

Figure 3:
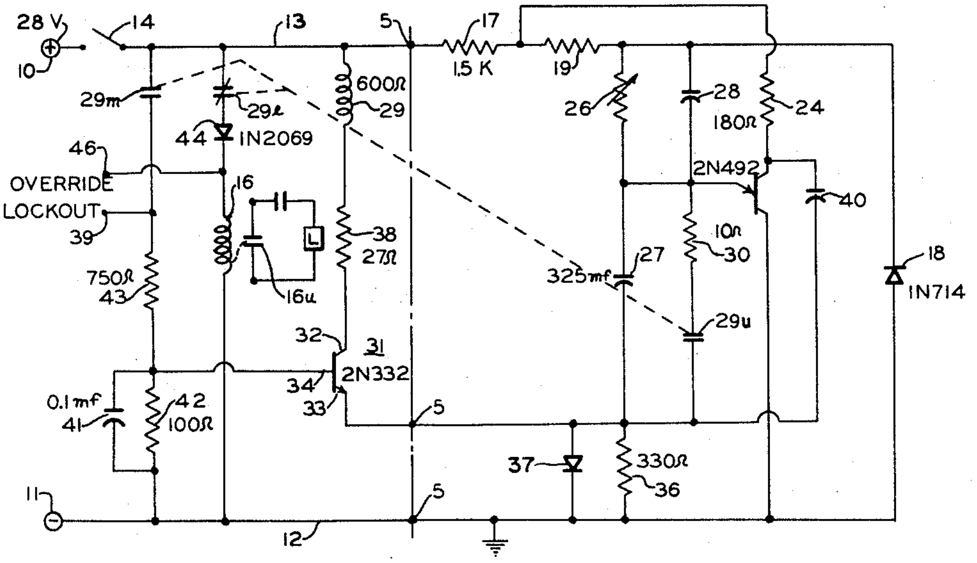
FIG. 3 is a schematic circuit diagram of another embodiment of the invention.

The circuit of FIG. 3 is substantially the same as that illustrated in FIG. 2 with the same reference designations being maintained. The circuit shown in FIG. 3 includes a delayed drop-out relay instead of a delayed pull-in relay as shown in FIG. 2. The contacts **29*l* of relay 29 are shown as normally closed so as to provide immediately an energizing potential to output relay 16 when switch 14 is closed. In this circuit, the firing of double-base diode 20 after the predetermined time delay period controls the energization of relay 29 through transistor 31 causing output relay 16 to become deenergized and to control an output circuit through contacts 16*u*. A further change that is necessary in this modification is to connect the upper end of resistor 43 through a separate set of relay contacts 29*m* which are normally open. The lock-out source of positive potential may now be conveniently applied through resistor 43 to the base 34 so as to energize relay 29 under control of the operator. Contacts 29*l* then open and cause relay 16 to drop out. The remaining circuit operation is the same. Terminals 5—5—5** are provided to separate this circuit into two portions as will be explained hereinafter.

Figure 4:
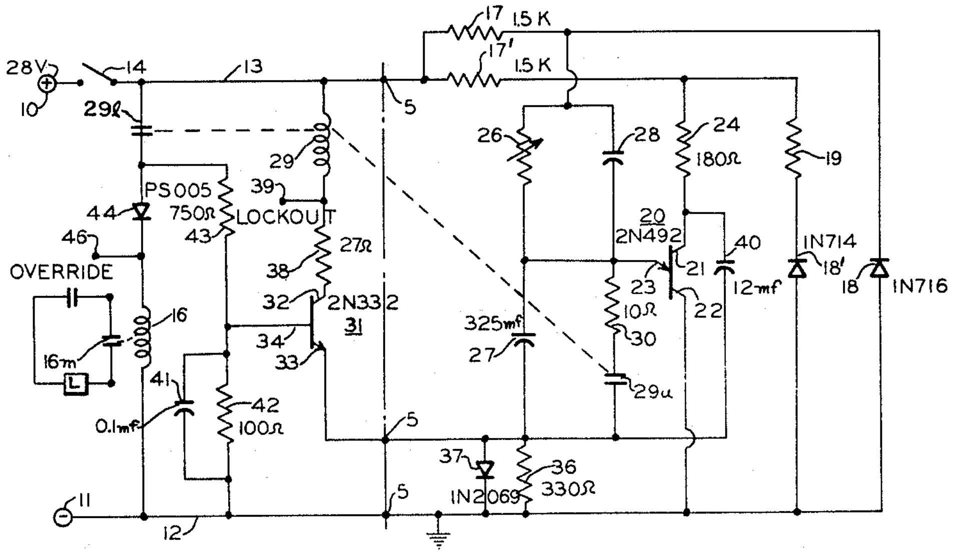
FIG. 4 is a schematic diagram of a still further embodiment of the invention.

The circuit shown in FIG. 4 is substantially the same as the circuit of FIG. 2 in that it provides a delayed pull-in relay circuit. The same reference numerals are used throughout to assist in the understanding of the similarities. In this circuit, as in FIG. 2, the closing of switch 14 begins the timing operation at the end of which double-base diode 20 fires causing transistor 31 to become conductive, energizing relay 29, energizing output relay 16 and closing the contacts **16*u* to the output circuit. In the FIG. 4 circuit both the timing circuit and the voltage across double-base diode 20 are controlled by separate zener diodes 18 and 18'. A separate voltage dropping resistor 17 and 17' is connected in series with each of the zener diodes to absorb line voltage changes. Resistor 19 in series with zener diode 18' is selected to absorb minor changes and to give a constant timing operation. It has been found that the separate regulations afford somewhat improved operation. Otherwise, the operation of FIG. 4 is the same as that described in connection with FIG. 2. FIG. 4 is also separated into two portions by terminals 5—5—5**.

It is also contemplated that a further modification involving the double regulation of FIG. 4 may be utilized in connection with a delayed drop-out relay by connecting the right-hand portion of FIG. 4 to the left-hand portion of FIG. 3 at the three terminals points 5—5—5. In each of the described embodiments, one of the features in common is the provision of the lower end of timing capacitor 27 at a point separate from ground so as to allow the emitter of transistor 31 to go below ground when the double-base diode fires. In this manner, a voltage is applied across the transistor 31 circuit which is greater than the voltage applied initially to terminals 10 and 11 allowing for a lower voltage to be used from the line supply.

Although the description of this invention has been set forth with respect to particular embodiments, it is not to be construed in a limiting sense. Many modifications and variations within the spirit and scope of the invention will now occur to those skilled in the art. For the definition of the invention, reference is made to the appended claims.

What I claim is:

1. A time delay circuit including a double-base diode having a base one terminal, a base two terminal and an emitter terminal, a first input line and a second input line, a start switch means for applying potential to said lines, connecting means from said base two terminal to said first line and from said base one terminal to said second line, a series connected timing circuit across said lines including a timing capacitor with one end connected to a first resistive means and to said emitter terminal of said double-base diode and with a second end joined to a second resistive means which connects to said second line, said second resistive means being included within both the charge and discharge path of said timing circuit, an output transistor having an emitter, collector and base electrode, load means connected between said collector and first input line, biasing means connected to said base normally maintaining said output transistor nonconducting, connecting means from said transistor emitter electrode to the junction between said timing capacitor and said second resistive means providing a triggering voltage pulse across said second resistive means of reverse polarity when said double-base diode fires to overcome the bias of said output transistor and to enable conduction of said output transistor energizing said load means and discharge means connected across said capacitor for discharging said capacitor upon energization of said load means to enable said double-base diode to turn off preparatory to a further timed period.

2. A time delay circuit as defined in claim 1 wherein said second resistive means includes a resistor shunted by a forwardly poled diode to provide a high impedance path to the discharge of said timing capacitor and a low impedance path to the conduction of said output transistor.

3. A time delay circuit as defined in claim 1 wherein said load means is a relay device which, when energized, closes contacts to complete a current path to provide a continuous forward bias to said output transistor to maintain said output transistor conducting once it has been triggered by the operation of said double-base diode.

4. A time delay circuit as defined in claim 1 wherein a stabilizing capacitor, having a capacitance small relative to that of said timing capacitor, is connected in shunt with said first resistive means.

5. In combination, a double-base diode having an emitter, base one and base two connection and a characteristic providing a discharge through the emitter-base one connections when the voltage applied to the emitter reaches a predetermined value, a first and a second line for receiving a source of direct current potential with said second line being a reference line, a timing circuit connected across said lines including at least a timing capacitor with one terminal connected to the emitter of said double-base diode and a second terminal connected to said reference line through a resistive means, said resistive means being included within both the charge and discharge path of said timing circuit, a connection from said reference line to said base one connection, a timing start switch means for causing a charging of said timing capacitor to fire said capacitor through said resistive means when said capacitor acquires a predetermined charge, a transistor having an emitter, base, and collector terminal, load means connecting the collector to said first line, circuit means connecting said transistor emitter to said second terminal of said timing capacitor for receiving a triggering pulse at said transistor emitter when said double-base diode conducts, discharge means connected across said capacitor for discharging said capacitor upon energization of said load means to enable said double-base diode to turn off preparatory to a further timed period, and means connected to said base for maintaining said transistor non-conducting until said double-base diode fires.

6. The combination as defined in claim 5 wherein said resistive means includes a resistor shunted by a forwardly poled diode, providing a high impedance to the discharge of said capacitor enabling the conduction of said transistor and providing a low impedance to said continued conduction of said transistor.

7. The combination of claim 6 wherein said transistor is maintained conductive by a forward bias even after the energy of said timing capacitor has become dissipated.

8. A timing circuit comprising a source of supply voltage, a double-base diode having an emitter, base one, and base two electrode, selective switching means connecting said source of supply voltage across said base one and base two electrodes, a first resistor and a capacitor in a charging circuit across said source of supply voltage, means connecting said capacitor in a discharge circuit including a second resistor and the emitter and base one electrode of said double-base diode, said second resistor also being included in the charging circuit, semiconductor means poled to serve as a low impedance bypassing said second resistor during charging of said capacitor and a high impedance paralleling said second resistor during discharge of said capacitor, and output transistor means triggered by the voltage generated across said second resistor when said double-base diode is rendered conducting.

References Cited in the file of this patent

UNITED STATES PATENTS

| | | |
|---|---|---|
| 2,949,545 | White | Aug. 16, 1960 |
| 2,970,228 | White et al. | Jan. 31, 1961 |
| 2,997,665 | Sylvan | Aug. 22, 1961 |
| 3,071,698 | Thompson et al. | Jan. 1, 1963 |
| 3,109,965 | Winchel | Nov. 5, 1963 |